United States Patent
Kang et al.

(10) Patent No.: US 11,180,251 B2
(45) Date of Patent: Nov. 23, 2021

(54) COMPACT UNMANNED AERIAL SYSTEM

(71) Applicant: U.S. Army Research Laboratory, Adelphi, MD (US)

(72) Inventors: Hao Kang, Abingdon, MD (US); John W. Gerdes, III, Bel Air, MD (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 266 days.

(21) Appl. No.: 16/120,488

(22) Filed: Sep. 4, 2018

(65) Prior Publication Data

US 2020/0070977 A1   Mar. 5, 2020

(51) Int. Cl.
*B64C 39/02* (2006.01)
*F41F 1/00* (2006.01)

(52) U.S. Cl.
CPC .......... *B64C 39/028* (2013.01); *B64C 39/024* (2013.01); *F41F 1/00* (2013.01); *B64C 2201/08* (2013.01); *B64C 2201/107* (2013.01); *B64C 2201/165* (2013.01); *B64C 2201/20* (2013.01)

(58) Field of Classification Search
CPC . B64C 39/024; B64C 39/028; B64C 2201/08; B64C 2201/107; B64C 2201/165; B64C 2201/20; F41F 1/00
USPC .......................................................... 244/63
See application file for complete search history.

(56) References Cited

U.S. PATENT DOCUMENTS

| | | | |
|---|---|---|---|
| 6,260,797 B1 | 7/2001 | Palmer | |
| 6,923,404 B1 | 8/2005 | Liu et al. | |
| 7,185,851 B2 | 3/2007 | Elam | |
| 7,437,985 B2 | 10/2008 | Gal | |
| 7,739,938 B2 | 6/2010 | Nair et al. | |
| 7,849,628 B2 | 12/2010 | Condon et al. | |
| 8,115,149 B1 | 2/2012 | Manole et al. | |
| 8,584,985 B2 | 11/2013 | Woolley et al. | |
| 8,662,441 B2 | 3/2014 | Powell et al. | |
| 8,783,604 B2 | 7/2014 | Sanderson et al. | |
| 9,033,281 B1 | 5/2015 | Adams | |
| 9,580,165 B1 | 2/2017 | Alley et al. | |
| 2009/0134273 A1* | 5/2009 | Page | B64C 39/024 244/63 |
| 2015/0142210 A1* | 5/2015 | Warsop | B64C 5/06 701/2 |
| 2016/0009412 A1* | 1/2016 | Manasseh | B64F 1/04 244/63 |
| 2016/0137312 A1* | 5/2016 | Osterhout | B64C 39/024 244/17.23 |
| 2017/0101180 A1* | 4/2017 | Adams | B64C 39/024 |
| 2018/0101169 A1* | 4/2018 | Applewhite | G08G 5/0069 |

* cited by examiner

*Primary Examiner* — Brady W Frazier
(74) *Attorney, Agent, or Firm* — Alan I. Kalb

(57) ABSTRACT

A method and apparatus for an unmanned aerial system is described herein. An unmanned aerial system capable of being launched from a grenade launcher includes a tubular body that encloses a compartment for a payload and a battery, a motor coupled to the tubular body, a propeller coupled to the motor, and a parachute disposed within the tubular body when the unmanned aerial system is in a stowed configuration and disposed outside of the tubular body when the unmanned aerial system is in a powered flight configuration.

1 Claim, 7 Drawing Sheets

COMPACT UNMANNED AERIAL SYSTEM

GOVERNMENT RIGHTS IN THIS DISCLOSURE

Governmental Interest—The disclosure described herein may be manufactured, used and licensed by or for the U.S. Government. Research underlying embodiments of the present disclosure was sponsored by the U.S. Army Research Laboratory (ARL).

FIELD

Embodiments of the present disclosure generally relate to unmanned aerial vehicles, and more specifically, to grenade launched unmanned aerial vehicles.

BACKGROUND

An unmanned aerial vehicle ("UAV") is an aircraft without a human pilot. Unmanned aerial systems ("UAS") include a communication system between a UAV and a ground based controller. UAS are often used to conduct intelligence, surveillance, and reconnaissance ("ISR") activities. In some situations (e.g., combat zones, hazardous environments and the like), personnel may benefit from obtaining ISR data to assess a situation or gather intelligence. The inventors have discovered that current unmanned aerial vehicles are subject to a highly limiting tradeoff between size and endurance.

Accordingly, the inventors have provided embodiments of an improved unmanned aerial vehicle.

SUMMARY

Methods and apparatus for an unmanned aerial system are provided herein. An unmanned aerial system capable of being launched from a grenade launcher includes a tubular body that encloses a compartment for a payload and a battery, a motor coupled to the tubular body, a propeller coupled to the motor, and a parachute disposed within the tubular body when the unmanned aerial system is in a stowed configuration and disposed outside of the tubular body when the unmanned aerial system is in a powered flight configuration.

In some embodiments, a method for a grenade launched unmanned aerial system ("GLUAS") includes loading a GLUAS projectile into a grenade launcher, launching the GLUAS towards a target, transforming the GLUAS from a projectile to an unmanned aerial system, wherein the unmanned aerial system includes a propeller, a motor, and an aerodynamic surface.

In some embodiments, an unmanned aerial system includes a tubular body, a battery disposed within the tubular body, a motor electrically coupled to the battery, the motor having a shaft that is rotatable, a propeller mounted to the shaft, wherein the propeller includes a plurality of foldable blades, wherein the plurality of foldable blades are in a folded configuration when the unmanned aerial vehicle is in a stowed configuration, and a paraglider wing.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. The appended drawings illustrate some embodiments of the disclosure and are therefore not to be considered limiting of scope, for the disclosure may admit to other equally effective embodiments.

Figure 1:
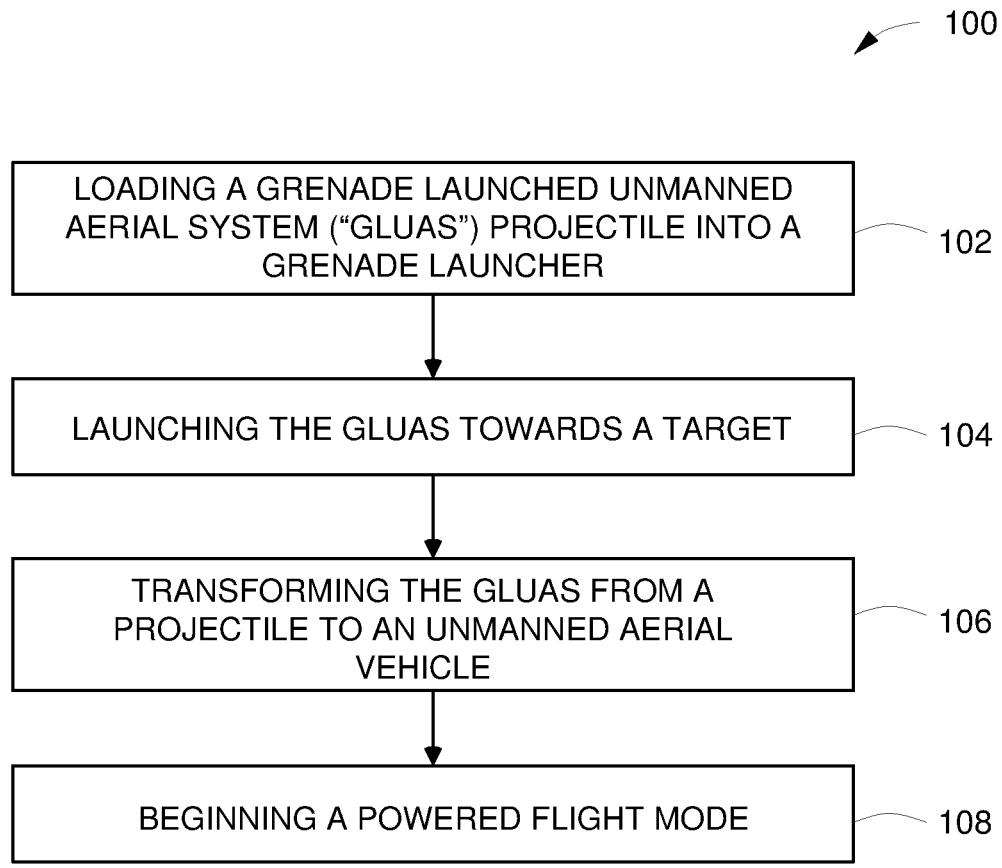
FIG. 1 depicts a flow chart of a method of using a GLUAS in accordance with some embodiments of the present disclosure.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Embodiments of a grenade launched unmanned aerial system ("GLUAS") and methods of using a GLUAS are provided herein. Although the teachings disclosed herein can be adapted to any grenade launcher, in some embodiments, the grenade launcher is a 40 mm launcher. In some embodiments, the grenade launcher is a M79, M203, or MK-1 launcher. The GLUAS can be remote-controlled or autonomously controlled. In some embodiments, the GLUAS has a range of 2 kilometers. In some embodiments, the GLUAS can operate at an altitude of up to 2000 ft. In some embodiments, the GLUAS can operate for a duration of 30 to 90 minutes.

FIG. 1 depicts a flow chart of a method 100 of using a GLUAS in accordance with some embodiments of the present disclosure. In some embodiments, the method 100 may be advantageously used in conducting intelligence, surveillance, and reconnaissance ("ISR") activities. For example, the method 100 may be used by military personnel to conduct ISR activities using existing hardware and minimal additional equipment. In some embodiments, the method 100 may be used for security agencies for surveillance and control. In some embodiments, the method 100 can be used to inspect power lines and monitor natural disasters.

Figure 2:
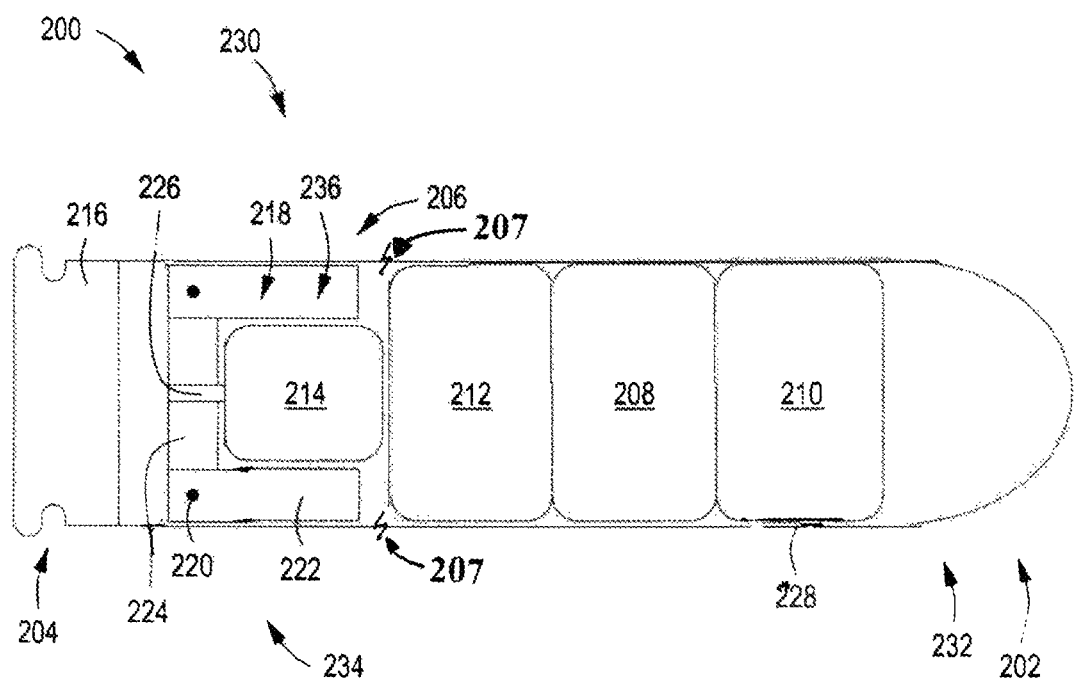
FIG. 2 shows a schematic illustration of a GLUAS projectile in accordance with some embodiments of the present disclosure.

The method begins at 102 by loading a GLUAS projectile into a grenade launcher. FIG. 2 shows a schematic illustration of a GLUAS projectile 200 in accordance with some embodiments of the present disclosure. The GLUAS projectile 200 has a front end 202 and a rear end 204. The GLUAS projectile 200 includes propellant 216 disposed near the rear end 204 and within casing 206. The GLUAS projectile 200 includes an unmanned aerial system ("UAS") 230 in a stowed configuration. In some embodiments, the GLUAS projectile 200 has an outer diameter that is compatible with a 40 mm grenade launcher. The UAS 230 has a front end 232 and a rear end 234 near the front end 202 and the rear end 204 of the GLUAS projectile, respectively. The UAS 230 includes a tubular body 228 that includes a compartment that encloses a payload 210, an expandable lift-producing aerodynamic surface, such as a parachute 208 that is in a folded configuration, and a battery 212. The casing 206 is connected to the tubular body 228 at a releasable attachment point 207. In some embodiments, the payload 210 is disposed near the front end 232. The payload 210 includes at least one of a control system, an electronic device, a camera, or the like.

The UAS includes a motor 214 near the rear end 234 electronically coupled to the battery 212. A shaft 226 extends from the motor 214 towards the rear end 234. A propeller 218 having a plurality of foldable blades 236 is mounted to the shaft 226. Each blade of the plurality of foldable blades 236 includes a first part 222 rotatably coupled to a second part 224 via a hinge 220. When the UAS 230 is in a stowed configuration, the plurality of foldable blades 236 are in a folded configuration where the first part 222 is rotated radially inwards towards the motor 214. In use, the motor 214 is capable of rotating the shaft 226 to drive the propeller 218.

In some embodiments, an operator enables a ground controller and arms the UAS 230 to establish a communication link between the ground controller and the UAS 230 (See FIG. 8) prior to 102.

Next, at 104, the GLUAS projectile 200 is launched towards a target. In some embodiments, the GLUAS projectile 200 is aimed upwards in a ballistic arc that is greater than 45 degrees of inclination. When launched, the propellant 216 in the GLUAS projectile 200 is capable of lifting the GLUAS projectile 200, while the UAS 230 is packaged within the GLUAS projectile 200. When a desired altitude is reached, the propellant 216 and the casing 206 fall away from the UAS 230. When a specified airspeed is reached, hinged flaps or stub wings in a central region between the front end 232 and the rear end 234 of the UAS 230 will open.

Figure 5A:
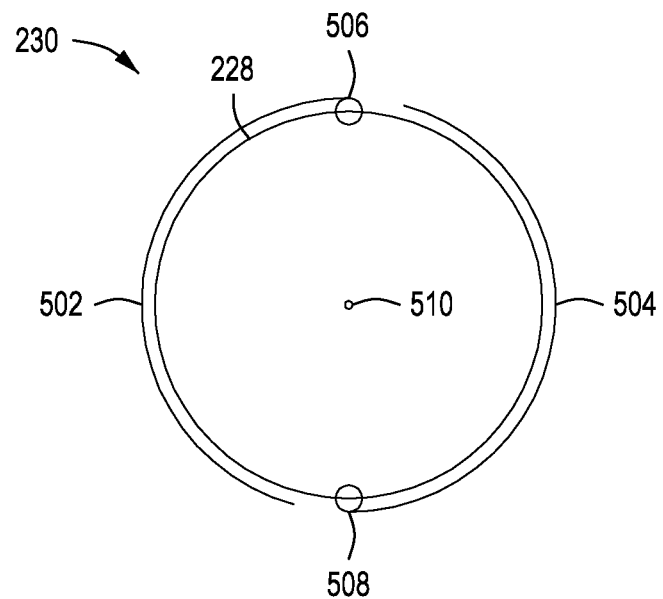
FIG. 5A depicts a UAS having hinged flaps in a stowed configuration according to some embodiments of the present disclosure.
Figure 5B:
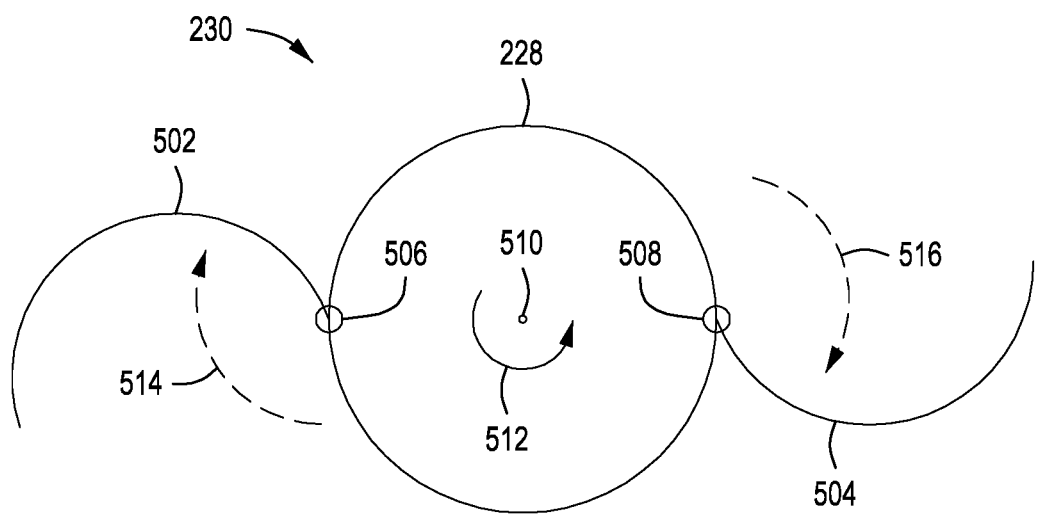
FIG. 5B depicts the UAS of FIG. 5A having hinged flaps in an open configuration.

FIGS. 5A-B depict the UAS 230 having hinged flaps in a stowed configuration and an open configuration, respectively, according to some embodiments of the present disclosure. As shown in FIGS. 5A-B, the hinged flaps include a first flap 502 and a second flap 504. The hinged flaps can act as wings of the UAS 230. The first flap 502 is connected to the tubular body 228 via a first hinge 506. The second flap 504 is connected to the tubular body 228 via a second hinge 508. The first hinge 506 is generally diametrically opposed to the second hinge 508 about a central axis 510 of the UAS 230. In use, when the specified airspeed is reached, a counterclockwise spin 512 about the central axis 510 of the UAS 230 generated from a rifled launcher barrel causes the first flap 502 and the second flap 504 to open. The first flap 502 opens about the first hinge 506 along path 514. The second flap 504 opens about the second hinge 508 along path 516. The first hinge 506 and the second hinge 508 can include locking ratchets to keep the first flap 502 and the second flap 504 deployed in the open configuration.

Figure 6A:
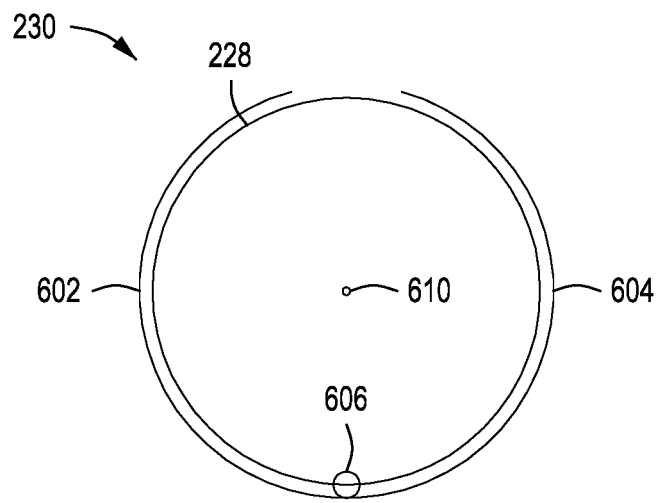
FIG. 6A depicts a UAS having hinged flaps in a stowed configuration according to some embodiments of the present disclosure.
Figure 6B:
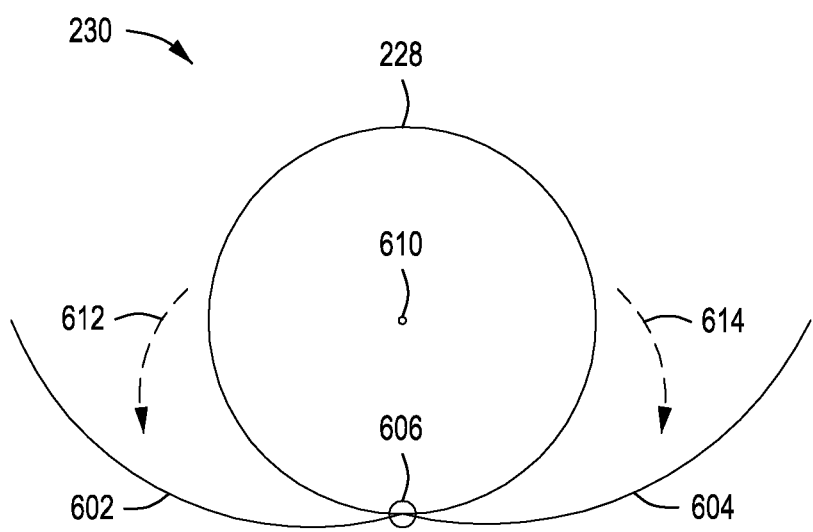
FIG. 6B depicts the UAS of FIG. 6A having hinged flaps in an open configuration.

FIGS. 6A-B depict the UAS 230 having hinged flaps in a stowed configuration and an open configuration, respectively, according to some embodiments of the present disclosure. As shown in FIGS. 6A-B, the UAS 230 includes a central axis 610 and includes a first flap 602 connected to the tubular body 228 via a hinge 606. The UAS 230 includes a second flap 604 connected to the tubular body 228 via the hinge 606. In some embodiments, the hinge 606 is a spring-loaded locking hinge. In use, when the specified airspeed is reached, the spring in the hinge 606 forces the first flap 602 away from the tubular body 228 along path 612 and the second flap 604 away from the tubular body 228 along path 614, putting the hinged flaps in the open configuration.

A spin that is imparted to the GLUAS projectile 200 following launch from a launcher will be slowed by drag generated by the hinged flaps or stub wings. Once the spin rate is low enough, the propeller 218 at the rear end 234 of the UAS 230 will start to rotate in the same direction of the spin. The spin of the GLUAS projectile 200 will be further arrested by aerodynamic and inertial torque of the rotating propeller 218. Consequently, the first part 222 of each blade of the plurality of foldable blades 236 will swing outward away from the motor 214 (i.e., unfold) due to the centrifugal force.

Next, 106 includes transforming the GLUAS from a projectile to an unmanned aerial vehicle. In some embodiments, the transforming occurs after an apex of the ballistic trajectory is reached. The transformation is realized by deploying an expandable lift-producing aerodynamic surface, such as the parachute 208, and activating a compact propulsion system that includes the battery 212, a controller (see FIG. 8), and the motor 214 with the propeller 218.

Figure 3:
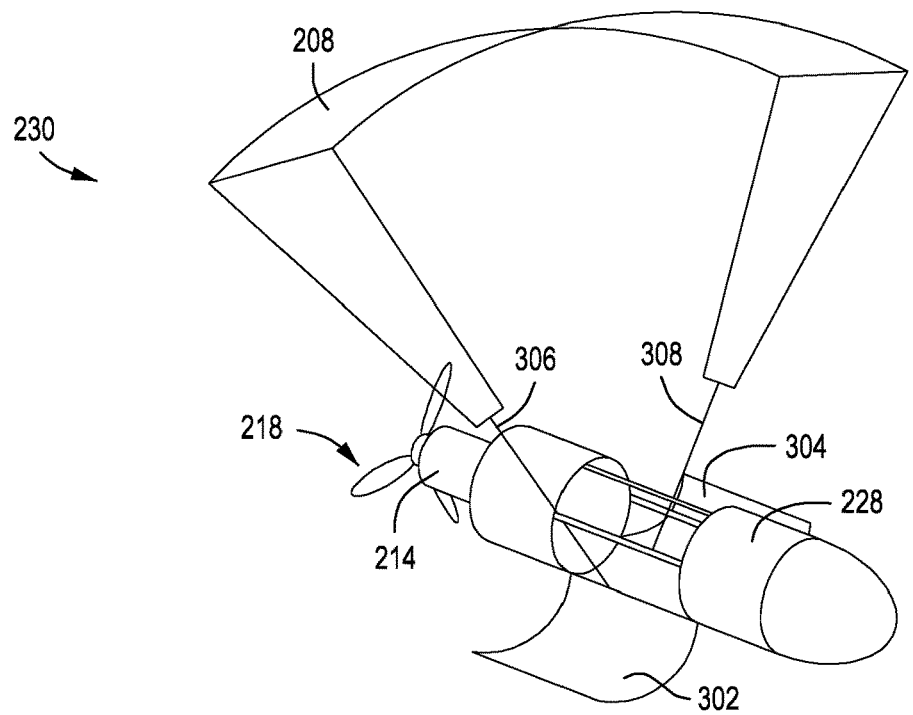
FIG. 3 depicts a UAS in a powered flight configuration in accordance with some embodiments of the present disclosure.

At 108, the UAS 230 begins a powered flight mode. In the powered flight mode, the battery 212 is configured to power the motor 214 to rotate the propeller 218 to provide propulsive thrust. FIG. 3 depicts a UAS 230 in a powered flight configuration in accordance with some embodiments of the present disclosure. A first flap 302 and a second flap 304 are swung outwards away from the tubular body 228 in an open position. In the open position, the first flap 302 and the second flap 304 are capable of providing lift to the UAS 230. The parachute 208 is in an unfolded position outside of the tubular body 228 to become, for example, a paraglider wing. The parachute 208 is connected to the UAS 230 with a plurality of tethers (a first tether 306 and a second tether 308 are shown in FIG. 3).

Figure 4:
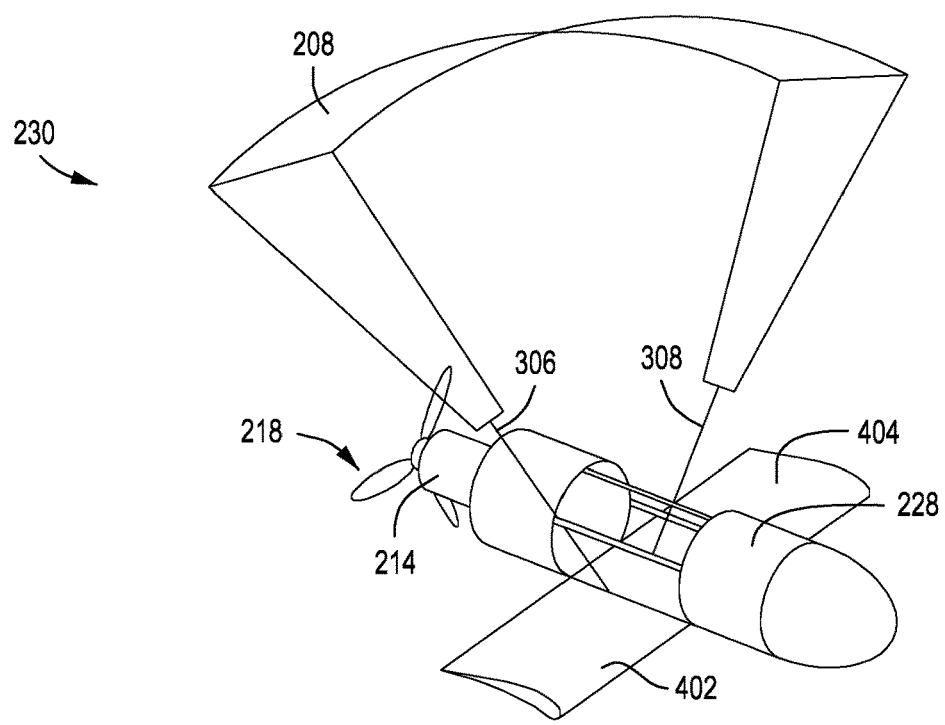
FIG. 4 depicts a UAS in a powered flight configuration in accordance with some embodiments of the present disclosure.

FIG. 4 depicts a UAS 230 in a powered flight configuration in accordance with some embodiments of the present disclosure. The UAS 230, as shown in FIG. 4, includes stub wings coupled to the tubular body 228. The stub wings include a first stub wing 402 and a second stub wing 404. When in an open position, the first stub wing 402 and the second stub wing 404 extend outwards away from the tubular body 228 on either side of the tubular body 228. In the open position, the first stub wing 402 and the second stub wing 404 are capable of providing lift to the UAS 230. When the UAS 230 is in the powered flight configuration, the parachute 208 is in an unfolded position outside of the tubular body 228 to become, for example, a paraglider wing. The parachute 208 is connected to the UAS 230 with a plurality of tethers (the first tether 306 and the second tether 308 are shown in FIG. 4).

Figure 7A:
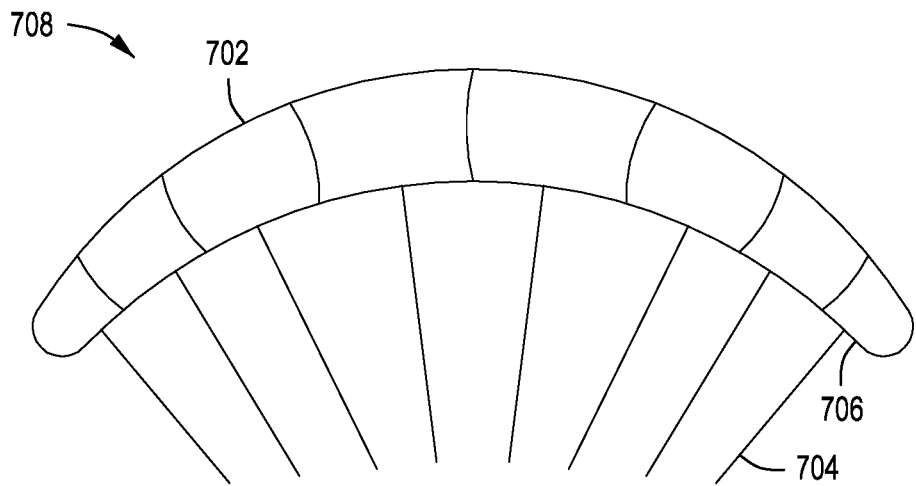
FIG. 7A depicts a parachute in an unfolded configuration in accordance with some embodiments of the present disclosure.
Figure 7B:
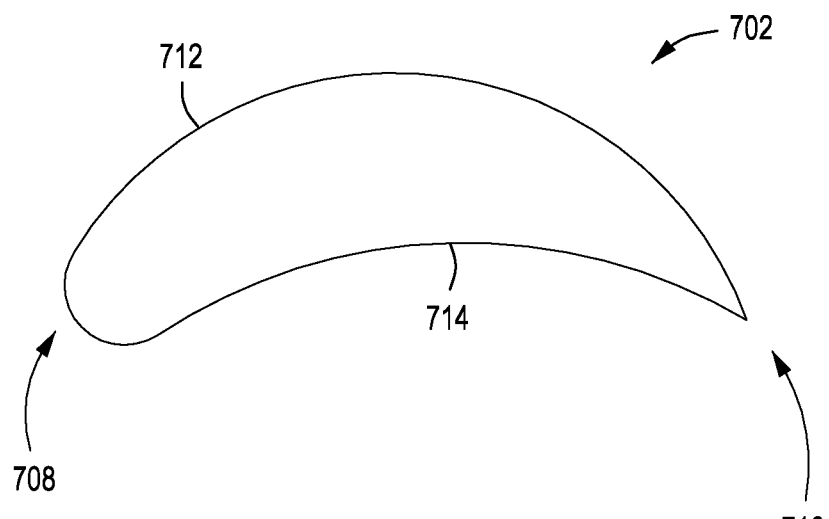
FIG. 7B depicts a side view of the parachute of FIG. 7A.

FIG. 7A depicts a parachute 208 in an unfolded configuration in accordance with some embodiments of the present disclosure. The parachute 208 includes an airfoil section 702 and a plurality of tethers 704. Each tether of the plurality of tethers 704 are coupled to the airfoil section 702 at a first end 706 and coupled to the UAS 230 at an opposite end. The airfoil section 702 can be made of MYLAR®, nylon, or the like. The plurality of tethers 704 can be made of nylon cord, KEVLAR®, or the like. FIG. 7B depicts a side view of the airfoil section 702 of FIG. 7A. The airfoil section 702 has an airfoil geometry configured to generate lift. The airfoil section 702 includes a front end 708 and a rear end 710. The airfoil section 702 includes an upper surface 712 and a lower surface 714. The front end 708 includes a rounded geometry. The upper surface 712 and the lower surface 714 form a sharp edge at the rear end 710. The lift generated by the airfoil section 702 along with the thrust provided by the propeller 218 advantageously increases the endurance (i.e. flight duration) of the UAS 230.

Directional control of the GLUAS is provided by deformations to the paraglider wing, deflections of the first and second stub wings 402, 404, deflections of the hinged flaps, throttle control of the motor 214, or the like. For example, pitch and climb rate can be controlled by modulating the throttle of the motor 214. Yaw and roll can be controlled by pulling on or adjusting the plurality of tethers 704 of the paraglider wing.

Figure 8:
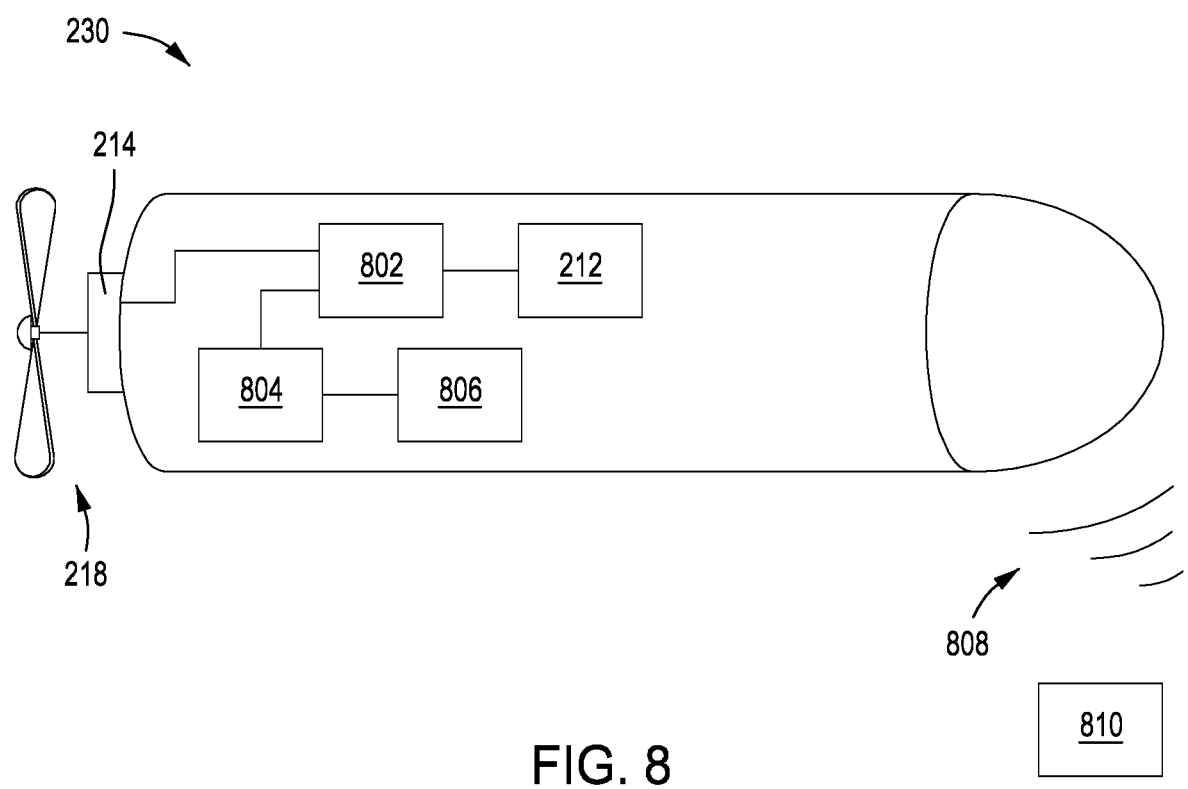
FIG. 8 depicts a schematic representation of electronic components of a UAS in accordance with some embodiments of the present disclosure.

In some embodiments, the GLUAS is equipped with electronic equipment to enable real-time ISR updates to one or many operators via a ground controller, a ground station, or the like. FIG. 8 depicts a schematic representation of electronic components of the UAS 230 in accordance with some embodiments of the present disclosure. The UAS 230 includes a controller 802 electrically coupled to the motor 214 and the battery 212. The controller 802 may include memory and support circuits. Inventive methods as described in the present disclosure may be stored in the memory as software routine that may be executed or invoked to control the operation of the UAS. The UAS 230 includes sensors 806 such as an accelerometer, a gyroscope, and a magnetometer. The UAS 230 can also include sensors 806 used to conduct ISR. The controller 802 and the sensors 806 are in electrical communication with a central processing unit (CPU) 804. The CPU 804 is typically a microprocessor or microcontroller that is capable of controlling the operation of the UAS 230. The UAS 230 is capable of using data from the sensors 806 to control the speed of the propeller via the controller 802 and the CPU 804. In some embodiments, the CPU 804 and controller 802 can lock the propeller to create drag to slow forward or spin velocities of the UAS 230. In some embodiments, the sensors 806 can activate a powered flight after spin slows to a predetermined velocity.

The UAS 230 includes a communication link 808. The communication link 808 is capable of providing data to a ground controller 810. The data can include audio data, visual data, or the like. In some embodiments, the UAS 230 can provide ISR updates to a Nett Warrior system that is typically carried by Soldiers.

While the foregoing is directed to embodiments of the present disclosure, other and further embodiments of the disclosure may be devised without departing from the basic scope thereof.

The invention claimed is:

1. An unmanned aerial system capable of being launched from a grenade launcher, comprising:
   a tubular body that encloses a compartment for a payload and a battery;
   a motor coupled to the tubular body;
   a propeller coupled to the motor; and
   a parachute disposed within the tubular body when the unmanned aerial system is in a stowed configuration and disposed outside of the tubular body when the unmanned aerial system is in a powered flight configuration, wherein a casing is coupled to the tubular body and having a propellant disposed within the casing, wherein the propeller includes a plurality of foldable blades, wherein each blade of the plurality of foldable blades include a first part that is rotatably connected to a second part, wherein, when the unmanned aerial system is in the stowed configuration, the first part is rotated radially inwards towards the motor, further comprising hinged flaps configured as a set of doors enclosing the parachute when closed and further configured to act as control surfaces when opened and coupled to the tubular body, wherein the unmanned aerial system is capable of communicating with a ground controller, wherein the payload includes one or more of a camera, a control system, and an electronic device.

* * * * *